United States Patent
Pos (10) Patent No.: US 10,414,297 B2
(45) Date of Patent: Sep. 17, 2019

(54) CHILD CAR SEAT FOR ATTACHING TO A MOTOR VEHICLE SEAT

(71) Applicant: CYBEX GmbH, Bayreuth (DE)

(72) Inventor: Martin Pos, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 15/756,505

(22) PCT Filed: Sep. 9, 2016

(86) PCT No.: PCT/EP2016/071288
§ 371 (c)(1),
(2) Date: Feb. 28, 2018

(87) PCT Pub. No.: WO2017/042326
PCT Pub. Date: Mar. 16, 2017

(65) Prior Publication Data
US 2018/0244178 A1     Aug. 30, 2018

(30) Foreign Application Priority Data

Sep. 9, 2015 (DE) .................... 20 2015 104 791 U (51) Int. Cl.
*B60N 2/28* (2006.01)
*B60N 2/42* (2006.01)

(52) U.S. Cl.
CPC ......... *B60N 2/2884* (2013.01); *B60N 2/2821* (2013.01); *B60N 2/2872* (2013.01); *B60N 2/4235* (2013.01)

(58) Field of Classification Search
CPC .. B60N 2/2884; B60N 2/2821; B60N 2/2872; B60N 2/4235

USPC ....................................................... 297/250.1
See application file for complete search history.

(56) References Cited

U.S. PATENT DOCUMENTS

2015/0336482 A1    11/2015  Pos

FOREIGN PATENT DOCUMENTS

| EP | 0958959 | 11/1999 |
|---|---|---|
| EP | 1927502 | 6/2008 |
| EP | 2746097 A1 | 6/2014 |
| JP | H1111199 A | 1/1999 |
| JP | 2015521558 A | 7/2015 |

(Continued)

OTHER PUBLICATIONS

"International Application No. PCT/EP2016/071288, International Preliminary Report on Patentability dated Mar. 22, 2018", (Mar. 22, 2018), 9 pgs.

(Continued)

*Primary Examiner* — Mark R Wendell
(74) *Attorney, Agent, or Firm* — Schwegman Lundberg & Woessner, P.A.

(57) ABSTRACT

A child car seat for attaching to a motor vehicle seat, said child car seat comprising a seat element, in particular a seat shell, and a side impact protection element which preferably comprises a folding element and can be moved from a resting position situated in particular within a standard width into a functional position situated in particular outside of the resting position and vice versa, wherein the child car seat has a position-changing device which is designed in such a way that the position-changing device automatically moves the side impact protection element from its resting position or an intermediate position between the resting position and the functional position into its functional position.

18 Claims, 7 Drawing Sheets

(56) References Cited

FOREIGN PATENT DOCUMENTS

| | | |
|---|---|---|
| WO | WO-2013189819 | 12/2013 |
| WO | WO-2017042326 | 3/2017 |

OTHER PUBLICATIONS

"International Application No. PCT/EP2016/071288, International Search Report and Written Opinion dated Nov. 29, 2016", (Nov. 29, 2016), 11 pgs.

"Japanese Application No. 2018-512541, Office Action dated Jul. 23, 2019", (Jul. 23, 2019), 10 pgs.

CHILD CAR SEAT FOR ATTACHING TO A MOTOR VEHICLE SEAT

PRIORITY CLAIM TO RELATED APPLICATIONS

This application is a U.S. national stage filing under 35 U.S.C. § 371 from International Application No. PCT/EP2016/071288, filed on 9 Sep. 2016, and published as WO2017/042326 on 16 Mar. 2017, which claims the benefit under 35 U.S.C. 119 to German Application No. 20 2015 104 791.6, filed on 9 Sep. 2015; the benefit of priority of each of which is claimed herein, and which applications and publication are hereby incorporated herein by reference in their entirety.

The invention relates to a child car seat for attaching to a motor vehicle seat according to claim 1.

In this context it should be noted that within the framework of this invention the term "child car seat" is to be understood as a generic term for (classical) child car seats and baby seats. Consequently, features provided for a child car seat within the framework of this invention are also basically applicable to a baby seat and conversely as long as nothing to the contrary is mentioned. The same also applies to the term "child" which is also to be understood as a generic term for children and babies as well as infants.

Child car seats and baby seats which can be attached to a motor vehicle seat have been known for some time. These child car seats or baby seats are used as seating accommodation for infants, babies and children and afford them increased protection, in particular in the case of an accident. Child car seats of this type are fastened by means of the belt system of the car or by means of isofix detents. A fastening of this type secures the child car seat on the motor vehicle seat so that this is held on the motor vehicle seat in particular in the case of a rear-end collision (impact) and is not hurled towards the front. However, these seats have proved problematical in the case of a side impact since both a belt fastening and also a fastening by means of isofix detents only provide insufficient protection of the child car seat or baby seat against a sideward movement of the seat. For this reason it is known to fit the child car seat with a side impact protection element, such as described for example in WO 2013/189819 A. In this child car seat, a seat shell and a side impact protection element applied to this is provided which can be brought from a resting position into a functional position wherein the side impact protection element is positioned so that it transfers any lateral forces behind the back of a child sitting in the child car seat and introduces them into the seat shell.

Safety is increased by means of a side impact protection element of this type. However, the protection against the consequences of a side impact is considered to be in need of further improvement.

It is therefore the object of the invention to provide a side impact protection element which is characterized by an improved protection against a side impact, in particular simplifies the operability and setting of a functional position of a side impact protection element.

This object is solved by a child car seat according to claim 1.

In particular, this object is solved by a child car seat for attaching to a motor vehicle seat comprising a seat element, in particular a seat shell, and a side impact protection element, preferably comprising a folding element, which can be brought from a resting position situated in particular within a standard width into a functional position situated in particular outside of the resting position and conversely, wherein the child car seat has a position changing device which is configured in such a manner that the position changing device automatically transfers the side impact protection element from its resting position or an intermediate position between the resting position and the functional position into its functional position. The standard width can be a width of 440 mm according to the AGREEMENT CONCERNING THE ADOPTION OF UNIFORMED TECHNICAL PRESCRIPTIONS FOR WHEELED VEHICLES, EQUIPMENT AND PARTS WHICH CAN BE FITTED AND/OR BE USED ON WHEELED VEHICLES AND THE CONDITIONS FOR RECIPROCAL RECOGNITION OF APPROVALS GRANTED ON THE BASIS OF THESE PRESCRIPTIONS (Revision 2, including the amendments which entered into force on 16 Oct. 1995), E/ECE/324, E/ECE/TRANS/505, Rev. 1/ADD.15/Rev. 6 dated 19 May 2009, Annex 17—Appendix 2. An essential point of the invention lies in that the position changing device is provided and enables an independent (automatic) transfer of the side impact protection element into its functional position. According to the invention, it was identified that as a result of the remaining or transfer into the functional position, which according to the prior art is accomplished by hand, there is a safety loophole for example when a locking is not (correctly) triggered or performed or only one intermediate position between the resting position and the functional position is set. The task of the position changing device, to transfer the side impact protection element into its functional position is thus taken away from the user. Overall the safety is increased.

According to a fundamentally independent aspect (which however can also be combined with the previous aspects), in particular a child car seat for attaching to a motor vehicle seat, comprising a seat element (seat shell) and a side impact protection element is proposed which can be brought from a resting position situated in particular within a standard width into a functional position situated in particular outside of the resting position and conversely, wherein the side impact protection element comprises a folding element, wherein a supporting section of an outer wall of the seat element is configured so that the folding element is guided at least temporarily during folding out and/or engagement by the supporting section of the outer wall of the seat element. Alternatively or additionally, the folding element in the functional position (in the unfolded state) can be received in a (the) supporting section (holding or contacting) of a (the) outer wall of the seat element.

A central aspect of the invention is therefore the use of the outer wall of the seat element for transferring a folding element from its resting position into its functional position or for (engaging) receipt (holding) of the folding element in its functional position. As a result, the structure of the child car seat is simplified which makes possible malfunctions less probable. In particular, malfunctions which may occur when using a retaining bolt, as proposed for example according to WO 2013/189819 A1 are avoided.

Preferably an actuating device is provided which is configured to cooperate with the position changing device in such a manner that when the actuating device is or was actuated, the position changing device automatically transfers the side impact protection element from its resting position or an intermediate position between its resting and functional position. This further simplifies operation.

An "intermediate position" should be understood in particular as a position in which the side impact protection element is only partially transferred from the resting position into the functional position, for example is only partially folded out (e.g. by an angle which corresponds to 10-80%, further preferably 10-60% of the entire opening angle or for example is only extended partially, in particular in a telescopic manner, for example by 10-90%, in particular 10-60% of the entire extension distance). In general an intermediate position can be present when a distal end of the side impact protection element has covered 10-90%, preferably 10-60% of its distance in the lateral direction during the transfer between the resting position into the functional position.

In principle, the side impact protection element (at least in sections) can be folded out, pivoted out, extended and/or pushed out and/or pulled out in a telescopic manner for transfer into the functional position.

Preferably the actuating device comprises an actuating button, preferably an unlocking button, in particular a push button or sliding button. The operability is thereby further simplified and thus the safety is increased.

In specific embodiments, the folding element and/or the actuating device can be embedded in the outer wall of the supporting element. Alternatively a lateral attachment with an overhang with respect to the adjacent surface of the outer wall of the seat element is also possible. In particular, the folding element and/or the actuating device can be folded into the outer wall of the seat element. In this way, it can be ensured that the child car seat does not project beyond a predefined width, in particular the standard width or envelope curve of the child car seat as a result of the side impact protection element provided in the resting position and when the folding element is in place, does not exceed a usual width of a child car seat, which additionally favours the manageability of the child car seat. Preferably in the functional position the folding element is also partially embedded in the outer wall of the seat element so that only a section of the folding element projects over the outer wall. Preferably in the functional position the folding element projects by at least 50%, further preferably at least 70%, but at most 90%, preferably 80% of its length over the outer wall of the seat element.

In a specific embodiment, the position changing device comprises at least one spring, in particular one tension spring. Alternatively or additionally a (the) supporting section of the outer wall of the seat element can be part of the position changing device. Furthermore an elongate hole can be provided for (sliding) receipt of an axis of rotation, preferably in the folding element. By means of a spring, a force can be provided in a simple manner which urges the side impact protection element into its functional position. If sections of the outer wall of the seat element are used as part of the seat transfer device, the entire structure is thereby simplified which also improves the safety. An elongate hole for (sliding) receipt of an axis of rotation (which for example is attached in a fixed position on the seat element) enables the folding element to simultaneously rotate in a simple manner and be transferred into its functional position (in which it is in particular locked). In general, such an elongate hole therefore allows a simultaneous rotation and translational displacement of the folding element. Overall the handling is further simplified.

Preferably in the functional position a proximal end of the folding element is held, in particular engagingly in a retaining section (retaining receptacle) of the outer wall of the seat element. A retaining or engaging function is therefore made possible by the folding element itself in cooperation with the otherwise provided outer wall of the seat element.

Preferably the supporting section has a guide section, which is configured so that a (the) proximal end of the folding element is forcibly guided on the guide section at least temporarily (during unfolding). In particular, the guide section is formed so that by means of a spring force (or other compressive or tensile force) the proximal end is pressed on the guide section during unfolding and can thus slide along the guide section. On the one hand this enables a defined folding movement and on the other hand, a certain support is also provided during folding which improves the stability of the entire structure. Overall the handling is made easier with few components which implicitly also means an improvement in safety.

A proximal end edge of the folding element can be configured to be curved outwards (convex) at least in sections. Alternatively or additionally, the supporting section and/or the guide section and/or the retaining section (retaining receptacle) can have a recess and/or an (inwardly) curved (concave) receptacle. Overall such a formation of folding element or the supporting section or parts of the supporting section enables a simplified guidance and retaining (engagement) of the folding element. Operation is thereby simplified.

The retaining section can adjoin the guide section. Preferably the retaining section is bent with respect to the guide section. As a result, a clearly defined boundary exists between retaining section and guide section so that on the one hand the folding element can be guided simply and effectively and then (when going beyond this boundary), slid into the retaining section (and optionally engaged there). The functionality of the child car seat, in particular its handling and operation is thereby simplified.

In the functional position the folding element can be positioned and held so that a transfer into the resting position is (only) possible by pulling the folding element, (for example, at a distal end of the same), in particular a locking in the functional position can (only) be cancelled by pulling. In general, the transfer from functional position into resting position does not take place automatically (but can possibly also take place independently) but is performed manually as in the prior art with regard to the transfer from resting position into functional position. This further simplifies the entire system. In particular, it was identified that in the converse case (transfer from functional position into resting position) it is less safety-relevant whether the resting position is ultimately completely reached or an intermediate position exists.

Preferably the folding element is locked in the functional position, in particular with respect to an (undesired) folding in (into its resting position). This improves the safety.

The folding element, in particular a section which runs in a proximal-distal direction, can be configured to be bent. This idea is also disclosed and claimed independently (possibly in combination with one or more of the above aspects). As a result of a bent design of the folding element, this can be transferred in a space-saving manner into the resting position and at the same time effectively protect against a side impact. The folding element can be arcuate in a cross-section perpendicular to the proximal-distal direction, at least in sections. Preferably the folding element has an (at least substantially) flat upper side and a bent underside in a cross-section perpendicular to the proximal-distal direction. Also as a result of such measures the folding element can be effectively embedded into the outer wall of the seat element (which overall enables a space-saving and nevertheless effective design). The proximal-distal direction is defined by a direction which runs from a proximal end to a distal end of the folding element.

In principle, only one laterally attached side impact protection element or folding element can be provided. Advantageously, however, corresponding side impact protection elements are provided on both sides of the child car seat. These can be configured identically (apart from a mirroring of the respective structures). It would also be feasible to provide even more than only two side impact protection elements (as described above), for example two each on both sides.

Further embodiments of the invention are obtained from the subclaims.

The invention is described hereinafter with reference to an exemplary embodiment which is explained in detail with reference to the figures. In the figures.

In the following description the same reference numbers are used for the same parts and parts having the same effect.

Figure 1:
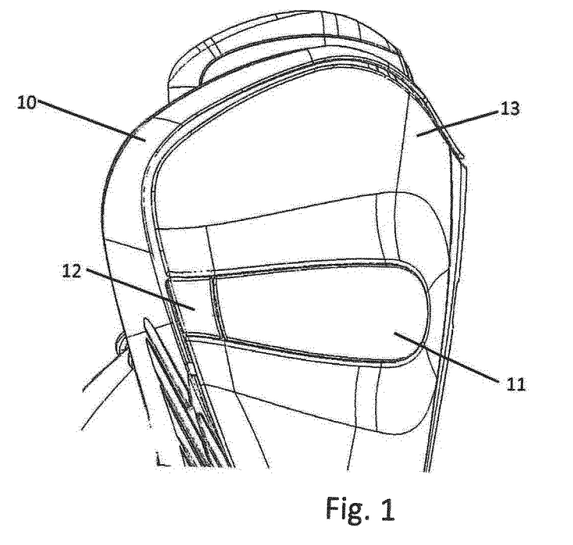
FIG. 1 shows a section of the child car seat according to the invention in a schematic side view.
Figure 12:
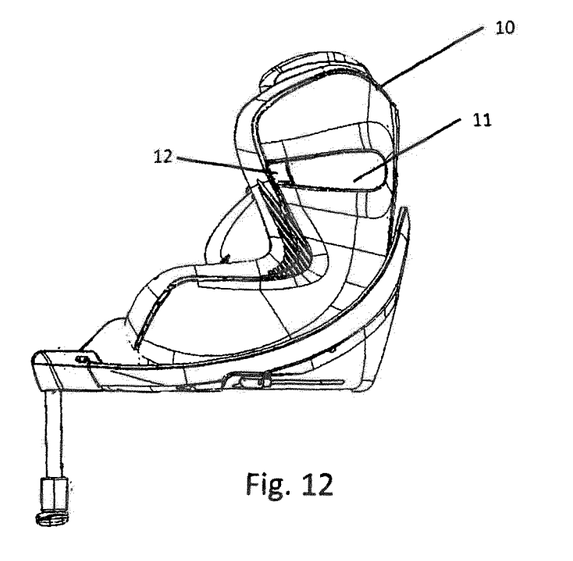
FIG. 12 shows a side view of the child car seat according to the invention.

FIG. 1 shows a side view of an upper portion of the child car seat according to FIG. 12. The child car seat comprises a seat element 10 (seat shell) and a side impact protection element, namely folding element 11 and an unlocking button 12. As can be seen in FIG. 1 and in particular FIG. 2, both the folding element 11 and also the unlocking button 12 are embedded in an outer surface 13 of the seat element 10 so that the unlocking button 12 and folding element 11 (see FIG. 2) go over at least substantially flush into the adjacent sections of the outer surface of the seat element 10. Furthermore, it can be seen in FIGS. 1 and 2 that the portions of the outer surface 13 adjoining the folding element 11 and unlocking button 12 form a (comparatively flat) projection. As a result, the folding element is already displaced outwards somewhat which improves the side impact protection.

According to the embodiment, the unlocking button 12 is mounted axially but can also be a slide button or be differently designed. Preferably however, the unlocking button is configured as a push button.

Unlocking button 12 or folding element 11 can also be attached to the outer surface 13 (for example, projecting from this).

Figure 2:
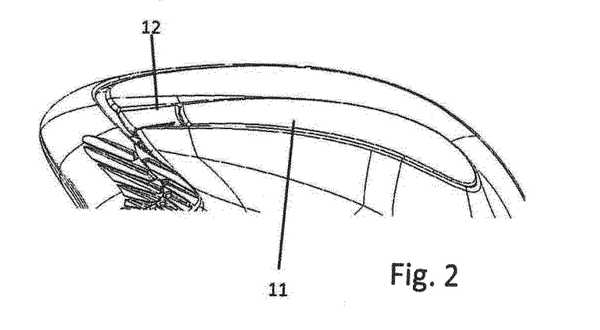
FIG. 2 shows another section of the child car seat according to FIG. 1.

In FIGS. 1 and 2 the folding element 11 is located in its resting position.

Figure 3:
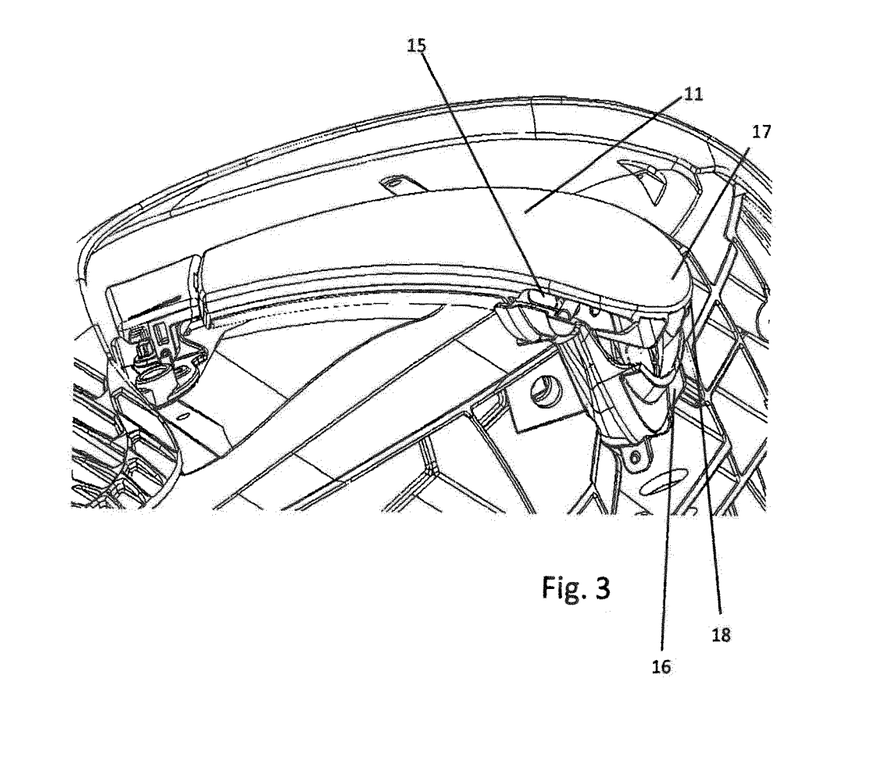
FIG. 3 shows another section of the child car seat, wherein the interior of the child car seat is partially exposed.

In the view according to FIG. 3, in which an interior of the child car seat can be seen in part, the folding element 11 is shown with further details. In particular, it can be seen that the folding element 11 is mounted on an axis 14 by means of an elongate hole 15 provided in the folding element 11. As a result, the folding element 11 can be rotated on the one hand about the axis 14 and on the other hand slide along the elongate hole with this axis. A receptacle 16 for a proximal end 17 of the folding element 11 can be further deduced from FIG. 3. In this receptacle 16 the folding element can be received in its functional position (not shown in FIG. 3). The receptacle 16 (pocket) is configured according to the embodiment as a separate part but can also (directly) be a part of the seat element (seat shell), i.e. configured in one piece with the outer wall of the seat element. As is explained further below in detail, a tension spring (cannot be seen in FIG. 3) is shown which provides a force in order to rotate the folding element 11 outwards upon triggering the actuating button 12 so that it can adopt its functional position.

Figure 4:
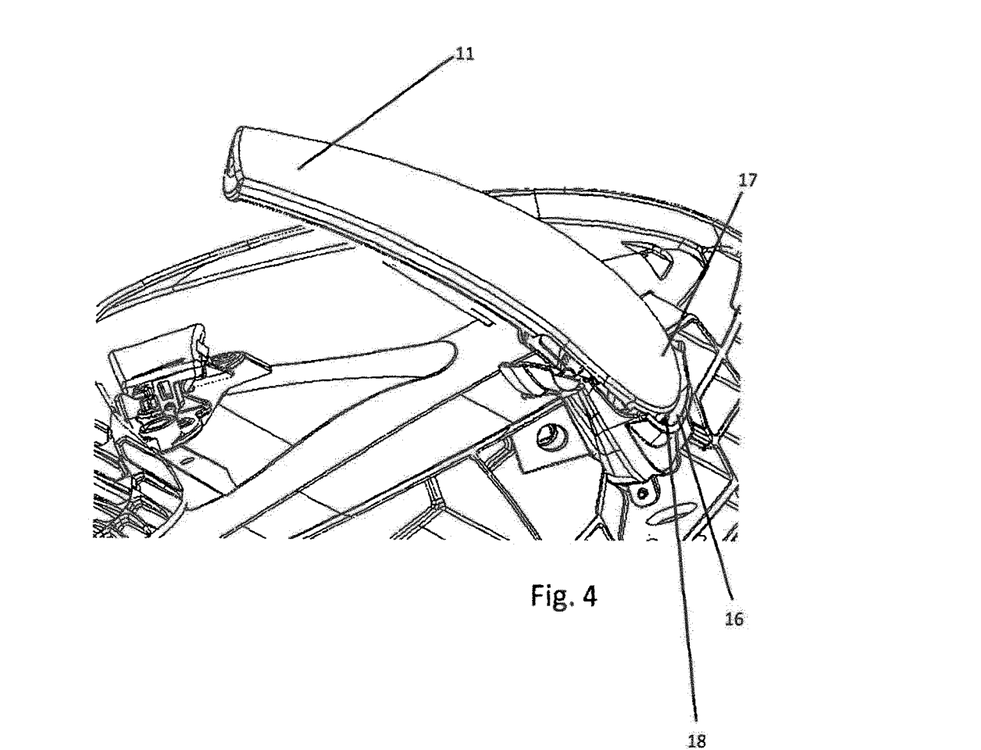
FIG. 4 shows a section of the child car seat similar to FIG. 3 with partially folded-out folding element.
Figure 5:
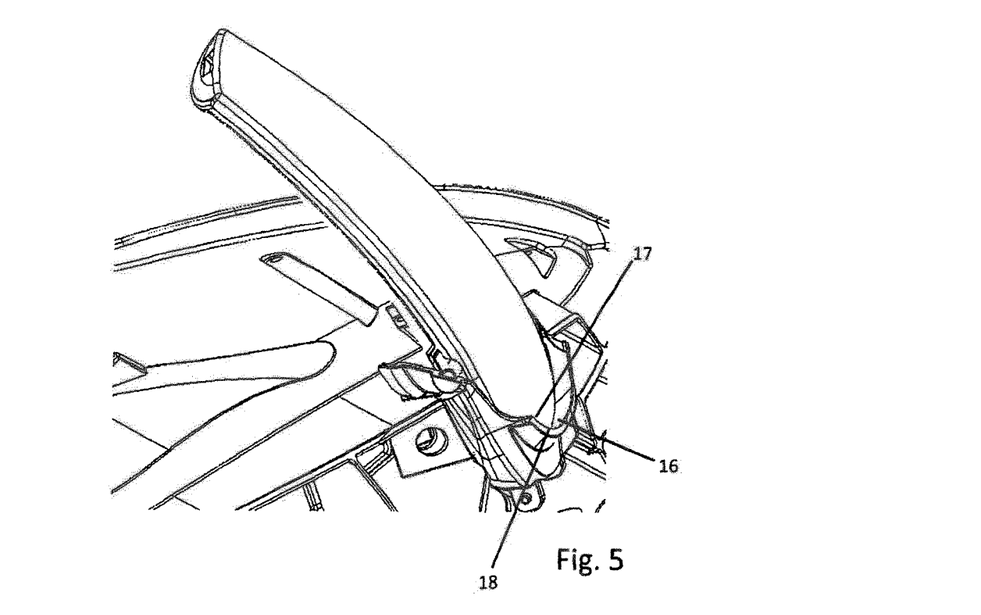
FIG. 5 shows a section of the child car seat similar to FIGS. 3 and 4 with completely folded-out folding element.

FIG. 4 shows a state which is adopted shortly after the actuating button 12 was triggered. In principle, this is an arbitrarily selected intermediate position during the movement sequence (rotation) for transferring the folding element 11 from the resting position according to FIG. 3 into the functional position according to FIG. 5. FIG. 5 therefore shows the functional position, i.e. the end position of the folding element 11. In this position the proximal end 17 of the folding element 11 is received in the receptacle 16. As can be seen in FIGS. 3-5, an end edge 18 is configured to be bent (convex) at the proximal end 17 of the folding element 11. Similarly the receptacle 16 is also configured to be bent (concave). The proximal end 17 can thus be mounted in a contacting manner in the receptacle 16. Overall an advantageous tight fit is achieved (as will be explained in detail in the following).

Figure 6:
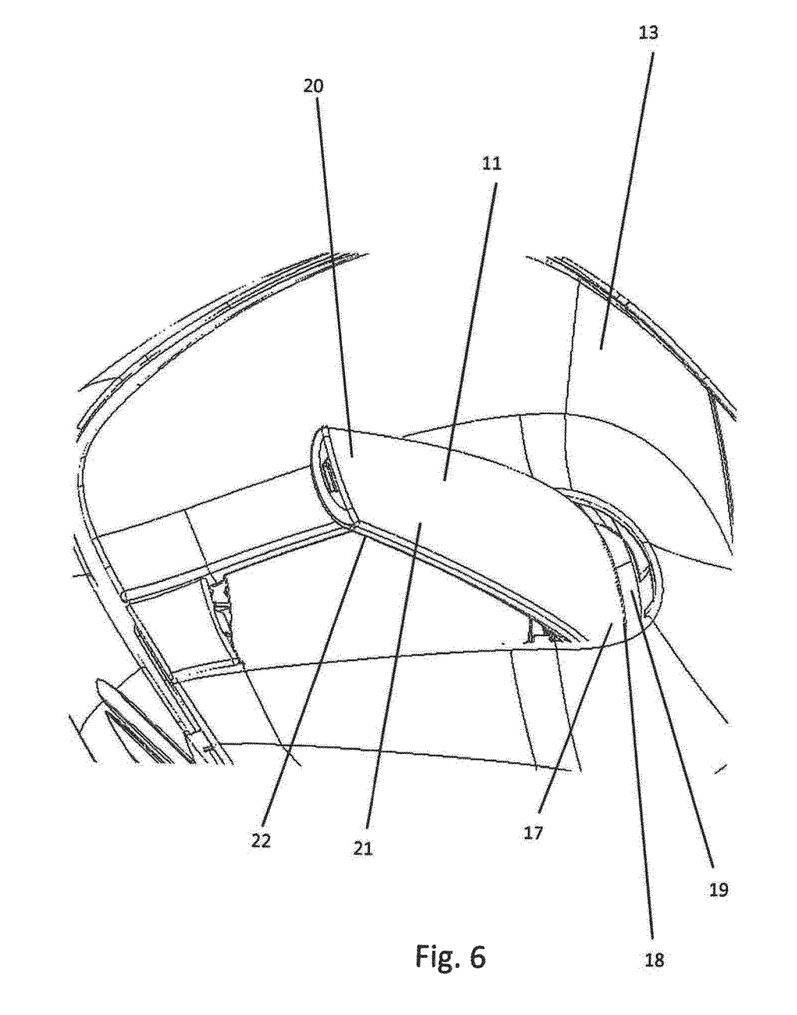
FIG. 6 shows a section of the child car seat with folded-out folding element in a schematic side view.

FIG. 6 shows a portion of a side view of the child car seat with pivoted-out folding element 11. It can be seen here that the seat element 10 has a guide surface 19 along which the proximal end 17 of the folding element 11 can slide during folding out. The spring (which cannot be seen here) ensures that the proximal end 17 or the end edge 18 thereof is pressed onto the guide surface 19. The guide surface 19 is also configured to be convex (in cross-section), i.e. curved outwards.

As can be seen in FIGS. 1-6, the folding element is designed to be curved and specifically in the proximal-distal direction which is defined by a direction which runs from the proximal end 18 to a distal end 20 (see FIG. 6). As a result, the folding element 11 is particularly advantageously matched to the outer wall 13.

In a cross-section perpendicular to the proximal-distal direction, the folding element 11 has a flat upper side 21 and a curved underside 22 wherein "upper" relates to the fact that in the folded-in state this surface points away from the seat element 10 and accordingly "lower" relates to the fact that the corresponding surface points towards the seat element in the folded-in state. The cross-section of the folding element is approximately half-moon shaped in the proximal-distal direction (the upper side 21 can therefore be configured to be at least slightly concave).

Overall the guide surface 19 (see FIG. 6) ensures that the folding element 11 can be rotated into its functional position in cooperation with the spring.

Figure 7:
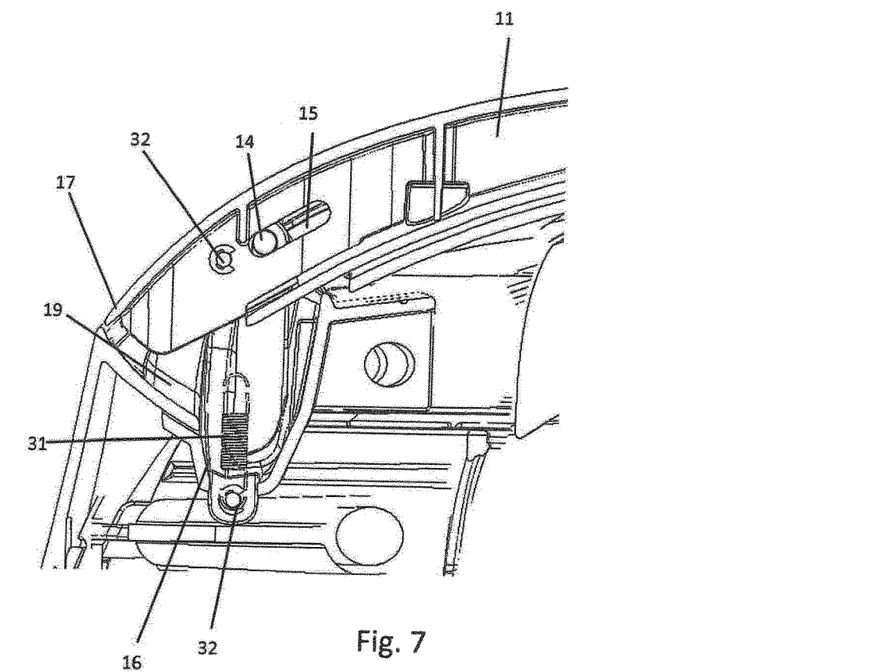
FIG. 7 shows a section through a portion of the child car seat.
Figure 8:
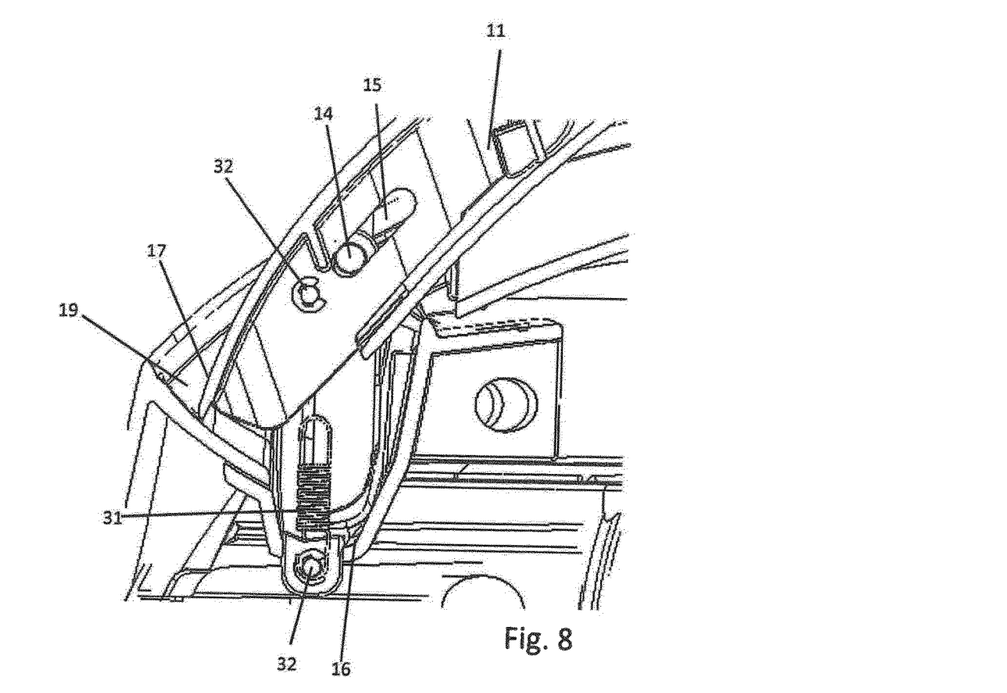
FIG. 8 shows a section similar to FIG. 7 in a second position of a folding element.

The cooperation with the spring can be deduced from FIGS. 7-11. FIG. 7 shows a cross-section of a portion of the child car seat. The folding element 11 is located in its resting position. If the actuating button 12 (not shown in FIG. 7, see for example FIGS. 1 and 2) is now actuated, the distal end (also not shown in FIG. 7) (see FIG. 6) 20 of the folding element 11 is freely movable so that as a result of the spring force of a spring element 31 shown in FIG. 7, the proximal end 17 of the folding element 11 slides along the receptacle or guide surface 19 (this is shown in FIG. 8).

For better understanding it should be noted that the spring element 31 acts between the suspension points 32 or acts on these (the spring shown in the figures is therefore to be understood purely schematically).

Figure 9:
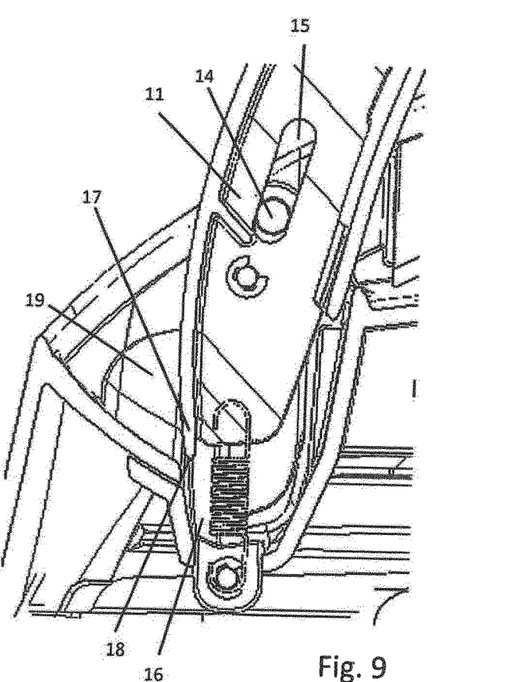
FIG. 9 shows a section similar to FIGS. 7 and 8 in a further position of the folding element.
Figure 10:
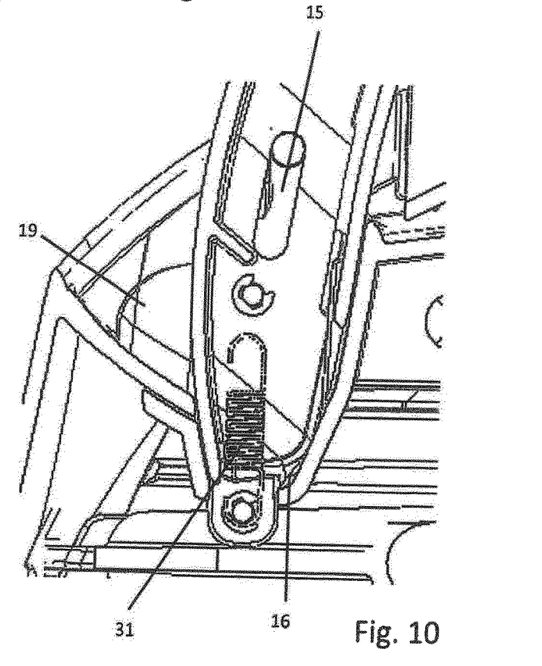
FIG. 10 shows a section similar to FIGS. 7-9 in a functional position of the folding element.

During sliding of the distal end 17 along the guide surface 19, the folding element 11 rotates about the axis 14 until an intermediate position shown in FIG. 9 is reached. In this intermediate position the distal end edge 18 is in a position (precisely) between guide surface 19 and receptacle 16. If (or because) the spring 31 now acts further, the distal end 17 slides into the receptacle 16 until the end position (functional position) in FIG. 10 is reached. During this sliding into the receptacle 16, the axis 14 slides along the elongate hole 15. For this reason the elongate hole 15 is oriented in the proximal-distal direction.

Figure 11:
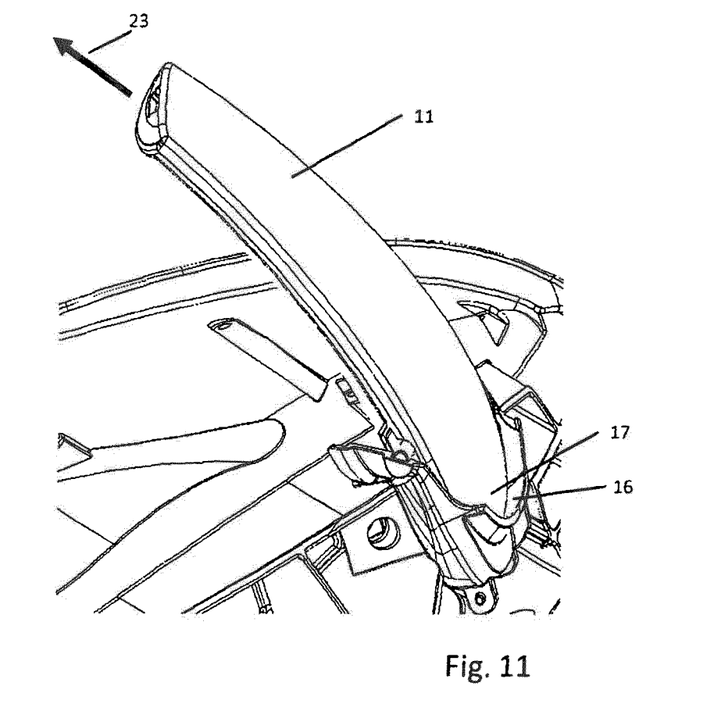
FIG. 11 shows a section of the child car seat wherein the view of the interior of the child car seat is partially exposed.

FIG. 11 shows the folding part 11 in the functional position. If the folding part 11 is now pulled in the direction of the arrow 23, the proximal end 17 moves out from the receptacle 16 (cf. for the converse case FIGS. 9 and 10) so that it can be folded in again after reaching the position according to FIG. 9 and can thus be brought into its resting position. This is accomplished manually against the tensile force of the spring which must therefore be overcome.

In order to now bring the folding element (the arm) back into its flat (closed) position, it can be sufficient that this is pulled briefly and raised and can then be rotated back into the locking position.

The receptacle 16 (pocket) has the advantage that in the case of a rear-end collision (impact), the folding element 11 is securely supported and held which overall improves the side impact protection function in a simple manner.

The present description relates in detail to one laterally attached side impact protection element or folding element 11. Advantageously however corresponding side impact protection elements are provided on both sides of the child car seat. These (apart from a mirroring of the respective structures) can be configured identically. It would also be feasible to provide even more than two side impact protection elements (as described above), for example two each on both sides.

At this point it should be noted that all the parts described above when viewed by themselves and in any combination, in particular the details shown in the drawings, are claimed as essential to the invention. Amendments to this are familiar to the person skilled in the art.

REFERENCE LIST

10 Seat element
11 Folding element
12 Unlocking button
13 Outer surface
14 Axis
15 Elongate hole
16 Receptacle
17 Proximal end
18 End edge
19 Guide surface
20 Distal end
21 Upper side
22 Underside
23 Arrow
31 Spring element
32 Suspension point

The invention claimed is:

1. A child car seat for attaching to a motor vehicle seat, the child car seat comprising:
   a seat element;
   a side impact protection element configured to be brought from a resting position situated within a predetermined width into a functional position situated outside of the predetermined width; and
   a position changing device configured to automatically move the side impact protection element from the resting position or an intermediate position between the resting position and the functional position into the functional position.

2. The child car seat according to claim 1, wherein the child car seat has an actuating device which is configured to cooperate with the position changing device in such a manner that when the actuating device is actuated, the position changing device automatically transfers the side impact protection element from its resting position or an intermediate position between its resting and functional position into its functional position.

3. The child car seat according to claim 2, wherein the actuating device comprises an actuating button.

4. The child car seat according to claim 2, wherein the side impact protection element comprises a folding element, wherein in the resting position the folding element and/or the actuating device are embedded in the outer wall of the seat element.

5. The child car seat according to claim 2, wherein the actuating button comprises an unlocking button including a push button or sliding button.

6. The child car seat according to claim 1, wherein the position changing device comprises at least one spring and/or a supporting section of the outer wall of the seat element and/or an elongate hole for receiving an axis of rotation.

7. The child car seat according to claim 1, wherein the side impact protection element comprises a folding element wherein in the functional position a proximal end of the folding element is held in a retaining section of an outer wall of the seat element.

8. The child car seat according to claim 1, wherein in the functional position the folding element is positioned and held so that a transfer into the resting position is possible by pulling the folding element.

9. The child car seat according to claim 8, wherein a locking in the functional position is configured to be cancelled by pulling.

10. The child car seat according to claim 1, wherein the side impact protection element comprises a folding element, wherein the folding element is locked in the functional position with respect to folding in.

11. The child car seat according to claim 1, wherein the side impact protection element comprises a folding element, wherein the folding element is configured to be bent in a section which runs in a proximal-distal direction and/or is arcuate in a cross-section perpendicular to the proximal-distal direction has a flat upper side and a bent underside.

12. A child car seat for attaching to a motor vehicle seat, the child car seat comprising:
    a seat element a side impact protection device configured to be brought from a resting position situated within a predetermined width into a functional position situated outside of the predetermined width, wherein the side impact protection comprises a folding element, wherein a supporting section of an outer wall of the seat element is configured so that the folding element is guided at least temporarily during folding out and/or engagement by the supporting section of the outer wall of the seat element and/or the folding element in the functional position is received in the supporting section.

13. The child car seat according to claim 12, wherein the supporting section has a guide section, which is configured so that a proximal end of the folding element is forcibly guided on the guide section at least temporarily during unfolding.

14. The child car seat according to claim 13, wherein a proximal end edge of the folding element is configured to be curved outwards at least in sections.

15. The child car seat according to claim 14, wherein in the functional position a proximal end of the folding element is held in a retaining section of the outer wall of the seat element.

16. The child car seat according to claim 15, wherein the retaining section adjoins the guide section.

17. The child car seat according to claim 14, wherein at least one of the supporting section, the guide section or the retaining section has at least one of a recess or a curved receptacle.

18. The child car seat according to claim 12, wherein the folding element is locked in the functional position with respect to folding in.

* * * * *